United States Patent [19]

Johnson

[11] Patent Number: 4,481,581
[45] Date of Patent: Nov. 6, 1984

[54] SEQUENCE CONTROL CIRCUIT FOR A COMPUTER

[75] Inventor: Courtenay P. Johnson, Almonte, Canada

[73] Assignee: Northern Telecom Limited, Montreal, Canada

[21] Appl. No.: 470,249

[22] Filed: Feb. 28, 1983

Related U.S. Application Data

[63] Continuation of Ser. No. 148,527, May 9, 1980, Abandoned.

[30] Foreign Application Priority Data

Mar. 31, 1980 [CA] Canada ............................ 348886

[51] Int. Cl.³ .............................................. G06F 9/00
[52] U.S. Cl. ................................................. 364/200
[58] Field of Search ............................. 364/200, 900

[56] References Cited

U.S. PATENT DOCUMENTS

| | | | |
|---|---|---|---|
| 3,411,147 | 11/1968 | Packard | 364/200 |
| 3,577,190 | 5/1971 | Dauber et al. | 364/200 |
| 3,736,567 | 5/1973 | Lotan | 364/200 |
| 3,736,569 | 5/1973 | Bouricius et al. | 364/200 |
| 4,003,033 | 1/1977 | O'Keefe et al. | 364/200 |
| 4,179,737 | 12/1979 | Kim | 364/200 |

OTHER PUBLICATIONS

"The AM2900 Family Data Book", pp. 4-21 and 44-63, Advanced Micro Devices, Inc., 1976.

"User Manual for the CDP1802 Cosmac Microprocessor", pp. 15, 37-38 and 47-48, RCA, 1976.

Patent Abstract of Japan, vol. 4, No. 66, (P-11)(548), 5/17/80, pp. 32P11 and JP-A-55 33 235, (Tokyo Shibaura Denki K.K.).

Hooley; "Bit Slice Technique Minimizes Microcontroller Cost/Complexity", Computer Design, vol. 18, #10, Oct. 1979, pp. 105-113.

Baron, "Control Your Next Pipeline Design with a Microprogrammed Sequencer", Electrical Design News, vol. 25, #6, 3/20/80, pp. 157-162.

*Primary Examiner*—Raulfe B. Zache
*Assistant Examiner*—David Y. Eng
*Attorney, Agent, or Firm*—R. C. Hogeboom

[57] ABSTRACT

Wait and skip commands in a digital computer are controlled by logic circuitry which performs the following functions in response to a skip command.
  (a) One of the computer's clocks is halted,
  (b) data bits in the microinstruction word are inhibited and predetermined data bits are substituted therefor.

The logic circuitry performs the following functions in response to a wait command.
  (a) Both of the computer's clocks are halted until the operation that are being waited upon is completed.

13 Claims, 3 Drawing Figures

SEQUENCE CONTROL CIRCUIT FOR A COMPUTER

This application is a continuation of Ser. No. 148,527, May 9, 1980, abandoned.

This invention relates generally to computers and more particularly to the computer control unit (CCU) of a digital computer when used to control peripheral devices (e.g. disc drives, etc.).

BACKGROUND OF THE INVENTION

In general and simplistic terms, digital computers are comprised of two main components, namely the data manipulation circuitry (of which the ALU, arithmetic and logic unit, forms one part) and the computer control unit (CCU) which controls the internal buses and subsystems of the data manipulation circuitry (also referred to as the processor), and synchronizes internal and external events and grants or denies permission to external systems.

In a typical digital computer, a data bus is commonly used by all of the subsystems (e.g. CCU, ALU, memories, etc.) in the computer. Information, instructions, address operands, data, and sometimes control signals are transmitted down the data bus under the control of a microprogramme. Note that a microprogramme is a form of programme used to run the internal logic of a computer by which a large portion of the computer's control is performed by a read only memory, ROM, (usually a programmable read only memory, PROM) rather than large arrays of gates and flip-flops. The use of microprogrammes frequently reduces the hardware needed in the CCU and provides a highly ordered structure in the CCU, not normally present when random logic is used. Additionally, microprogramming makes changes in the computer's instruction set very simple to perform, thereby reducing the post-production engineering costs for the system substantially.

The microprogramme selects the source of the data as well as the destination of the data. In complicated computers there may be more than one data bus.

An address bus is typically used to select a word stored in memory for an internal computer function, or to select an input/output port for an external subsystem or peripheral function. Also selected by microprogramme command, the source of the information for the address bus may be a programme counter, a memory address register, a direct memory address controller, or an interface controller, etc.

The arithmetic and logic unit (ALU) is actually that portion of the processor that computes. Depending upon the complexity of the ALU, a large number of different arithmetic functions can be accomplished. The most common minimum set, however, are the functions (A plus B), (A minus B), and (B minus A); where A and B are the ALU inputs. The logical functions are obtained from the same combinatorial logic array that is used for the arithmetic functions, but it is gated in a different manner. The usual minimum logical function capability is (A or B), (A AND B), and (A EXCLUSIVE-OR B). In addition to these combinatorial logic functions, there are sets of shift and rotate instructions that complete the basic instruction set.

The purpose of the computer control unit (CCU) is to translate an address into a microinstruction that can be fetched and executed. Note that there are two types of instructions recognized within the CCU, machine language (or macroinstructions) and random logic replacement (or microinstructions). Macroinstructions reside in main memory, are fetched and decoded into microinstructions which directly control the computer's resources.

As will be explained more fully later in this specification, a pipeline (or microprogramme) register is employed in the CCU to provide a function known as pipelining. In this process, a microinstruction is loaded from a microprogramme ROM into the microprogramme register (or pipeline register). A pipeline register speeds up a state machine of this sort because it allows the address of the microprogramme ROM to be changed, and its output to settle, while the current microinstruction is being presented to the computer hardware (ALU, processor) from the pipeline register. In other words, the pipeline register contains the microinstruction currently being executed while the next microinstruction to be executed sits at the input of the pipeline register. The result is that while the processor is executing one instruction, the next instruction is being fetched. The presence of the pipeline register allows the microinstruction fetch to occur concurrently with the data manipulation operation in the processor, rather than serially.

It is desirable to control the operation of the processor, via the CCU, with commands such as WAIT and SKIP. WAIT is a command used when synchronizing the relatively fast CCU with a relatively slow memory or input/output function. The WAIT command causes the processor to stop until the selected device acknowledges the operation is complete or the data is ready.

The SKIP command (not always used in the prior art) is employed with certain logic functions such that if a certain result is obtained (e.g. a positive result) then the next instruction (e.g. an error indication) is skipped.

The book *Am2900 Bipolar Microprocessor Family* copyrighted 1976 by Advanced Micro Devices, Inc. (AMD) of 901 Thompson Place, Sunnyvale, Calif. 94086, describes in detail the devices and features that have been discussed. Particular attention should be made to the device referred to as Am2901 (four-bit bipolar microprocessor slice) and described on pages 4 to 21 inclusive of the aforementioned book by AMD and also to the device referred to as Am2909 (microprogramme sequencer) and described on pages 44 to 63 inclusive of the aforementioned book by AMD.

Referring once again to the previously mentioned WAIT and SKIP commands, some complexity is encountered in implementing these commands due to the pipelining (i.e. pipeline register) technique employed. It will be recalled that while the current microinstruction is being executed, the next microinstruction sits at the input of the pipeline register. Consequently, if a SKIP command is to be the next command executed, a now unwanted microinstruction is already waiting on standby, so to speak, and it must be gotten rid of before the next desired microinstruction can be loaded into the pipeline register. A somewhat similar problem occurs for a WAIT command. When a WAIT command is being executed the next microinstruction is sitting at the input of the pipeline register, ready to be loaded into the pipeline register at the next clock pulse. The prior art, as exemplified by the Figure on page 60 of the aforementioned book by AMD, accomplishes the WAIT and SKIP function in a relatively complex fashion.

SUMMARY OF THE INVENTION

The present invention is directed to a simplification of this task by providing a relatively simple circuit, composed of relatively few components, to perform both a SKIP and a WAIT command. It should also be noted that the same portion of the microinstruction (stored in the microprogramme register) is used to control not only a SKIP and a WAIT, but also a jump to a subroutine, a return from a subroutine, a jump, and a continue (in sequence).

The present invention is a logic circuit for controlling the sequencing of events in the operation of a digital computer, wherein the computer is under the control of microinstructions, the logic circuit characterized by:

a skip logic device, responsive to the microinstructions for producing an output having either a first logic state indicative of a skip command or a second logic state indicative of a do not skip command;

a data gating device for transmitting either predetermined logic signals or logic signals representative of corresponding logic bits in the microinstruction, in response to either the output of the skip logic means or one of the bits in the microinstruction, and a clock device both for producing a first clock signal and a second clock signal wherein the first and second clock signals have the same frequency, and for selectively inhibiting the second clock signal from appearing at the output of the clock means in response to the output of the skip logic aeans.

Stated in other terms, the present invention is a logic circuit for controlling the sequencing of events in the operation of a digital computer, wherein the computer is under the control of microinstructions, the logic circuit characterized by:

a skip logic device, responsive to the microinstructions for producing an output having either a first logic state indicative of a skip command or a second logic state indicative of a do not skip command;

a data gating device for transmitting either predetermined logic signals or logic signals representative of corresponding logic bits in the microinstruction, in response to either the output of the skip logic means or one of the bits in the microinstruction;

a wait logic device responsive to the microinstructions for producing an output having either a first logic state indicative of a wait command or a second logic state indicative of a do not wait command; and a clock device both for producing a first clock signal and a second clock signal wherein the first and second clock signals have the same frequency, and for selectively inhibiting the second clock signal from appearing at the output of the clock means in response both to the output of the skip logic means and to the output of the wait logic means, and for selectively inhibiting said first clock signal from appearing at the output of said clock means in response to the output of said wait logic means.

Stated in yet other terms, the present invention is a method of controlling the sequencing of events in the operation of a digital computer, wherein the computer is under the control of microinstructions, the method characterized by:

producing a skip signal having a first logic state indicative of a skip command and a second logic state indicative of a do not skip command;

producing, in response to either the skip signal or to one bit in the microinstruction, a data gating signal having a first state indicative of producing predetermined logic signals and having a second state indicative of passing logic bits corresponding to logic bits contained in the microinstruction, producing a first clock signal; and producing a second clock signal, having the same frequency as the first clock signal and selectively inhibiting the second clock signal in response to the first logic state of the skip signal.

DETAILED DESCRIPTION

Figure 1:
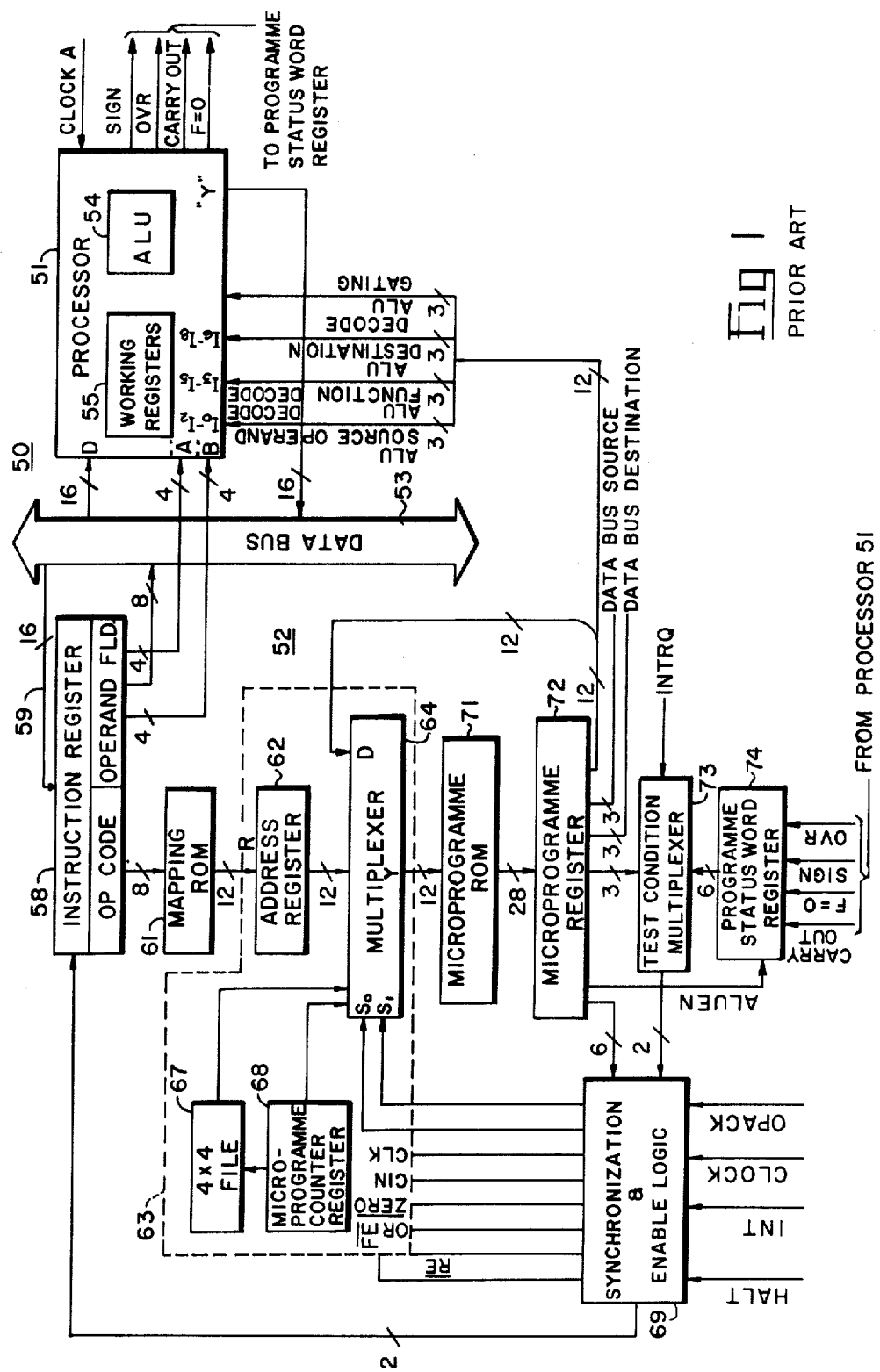
FIG 1 is a simplified block diagram of a prior art digital computer.

As FIG. 1 depicts a prior art digital computer, it will not be discussed in great detail. FIG. 1 is presented primarily to set the stage for the Figures that follow.

FIG. 1 depicts a general purpose digital computer 50 shown in simplified block form. Computer 50 comprises a processor 51 and a computer control unit (CCU) 52. A data bus 53 provides an interface between the processor 51 and CCU 52 as well as between other devices (e.g. keyboards, printers, etc. not shown). Processor 51 comprises arithmetic and logic unit (ALU) 54 and working registers 55. In the exemplary embodiment of FIG. 1, processor 51 is composed of four model Am2901 devices manufactured by Advanced Micro Devices, Inc. (AMD).

Computer control unit 52 comprises the remaining components of FIG. 1 (i.e. all but processor 51, and data bus 53). Computer control unit 52 is interconnected as shown in FIG. 1 and attention is directed thereto.

Instruction register 58 is a sixteen bit D-type register (e.g. four Am2918's by AMD). A sixteen bit macroinstruction is received by register 58 from data bus 53, via bus 59. The least significant 8 bits of the instruction contain the operation (OP) code; the most significant 8 bits contain the operand field.

The OP code can be one of two main types; it can be either a "register-to-register" instruction that has two operand fields (e.g. addition of the contents of registers A and B) or it can be a "branch" instruction. For a "register-to-register" instruction, the operand field is the address of the two registers involved (4 bits per address). With the branch instructions, the operand field is an 8-bit displacement address; the condition of the branch is implicit in the OP code, and the sum of the current programme address and the displacement address will be stored in microprogramme counter register 68 if the selected condition is logically true.

It should be noted that there are two types of instructions recognized within CCU 52. One type being macroinstructions (or machine language instruction) and the other being microinstructions (or random logic replacement instructions). Macroinstructions reside in main memory (not shown), are fetched and loaded into instruction register 58 and then decoded into microinstructions (appearing at the output of microprogramme ROM 71) which directly controls the computer's resources.

Commencing with the operand field portion of the instruction, the four most significant bits of the operand are applied to the "A" inputs (i.e. $A_0$, $A_1$, $A_2$, and $A_3$) of processor 51. The four least significant bits of the operand are applied to the "B" inputs (i.e. $B_0$, $B_1$, $B_2$, $B_3$) of processor 51. The operand field (8-bits) is fed back to the 8 least significant bits of data bus 53 so that they may be used to modify the contents of some other register in the system. The data output from processor 51 appears on the "Y" outputs (i.e. $Y_0, Y_1, \ldots Y_{15}$) and is applied to data bus 53, as shown.

Turning now to the operation (OP) code, it can be seen that all eight bits of the OP code are applied to the input of mapping ROM (read only memory) 61. Note that, in the exemplary embodiment, ROM 61 is comprised of three model Am29761 PROMs (programmable read only memories) manufactured by AMD, connected in parallel. Each Am29761 has a memory configuration of 256 words, each word having 4 bits. This results in ROM 61 having an output of 12 bits, which means that each of the 256 potential OP codes (i.e. $2^8$) has a unique 12-bit starting address. The output of ROM 61 (i.e. the starting address) is loaded into address register 62 which is a part of microprogramme sequence controller 63. The heart of controller 63 is multiplexer 64 which selects one out of its four input ports to be connected to its single output port Y. The four input ports are fed from address register 62, from 4×4 file 67, microprogramme counter register 68 and direct inputs from microprogramme register 72. The selection of which one of the four ports is to be selected and applied to the output of multiplexer 64 is made by signals $S_o$ and $S_1$ applied to multiplexer 64 from synchronization and enable logic 69.

In this embodiment, microprogramme sequence controller 63 is comprised of three model Am2909 devices manufactured by AMD. The purpose of controller 63 is to present an address to microprogramme ROM 71 such that a microinstruction can be fetched and executed. The address source is chosen by using binary signals $S_o$ and $S_1$ applied to multiplexer 64. The selected address may then be aodified by the input signal OR or the $\overline{\text{ZERO}}$ input function (the specifics of which are not depicted in the interests of simplicity and clarity). The $\overline{\text{RE}}$ signal input is employed to control address register 62, and Cin (carry-in) signal is used in conjunction with the control of microprogramme counter register 68. The CLK (clock) input is used, of course, to provide the clocking information for the various components of controller 63.

The output of multiplexer 64 is applied to microprogramme ROM 71. In this embodiment, ROM 71 is comprised of seven model Am29761 PROMs manufactured by AMD. Only 256 words of microprogramme storage are shown in ROM 71 (since each Am29761 stores 256 words of 4 bits each) but since 12 address bits are available there is the potential for 4096 (i.e. $2^{12}$) words of storage. When the output of microprogramme ROM 71 stabilizes, it is loaded into microprogramme register 72.

Microprogramme register 72, used in this manner, is referred to as a pipeline register. A pipeline register speeds up a state machine of this type because it allows the address of microprogramme ROM 71 to be changed, and its output to settle, while the current microinstruction is being presented to the computer hardware from microprogramme register 72.

The 12 most significant bits in register 72 are routed to both processor 51 and aultiplexer 64 in microprogramme sequence controller 63. The 10 least significant bits are used by synchronization and enable logic 69 and test condition multiplexer 73. The remaining 6 control bits from register 72 are used for data bus source and destination controls (not shown). Programme status word register 74 receives its input from processor 51 as shown. Register 72 is comprised of one model Am25LS161 (by AMD) for the four least significant bits, and six model Am2918s (by AMD) for the remaining twenty-four bits.

Figure 2:
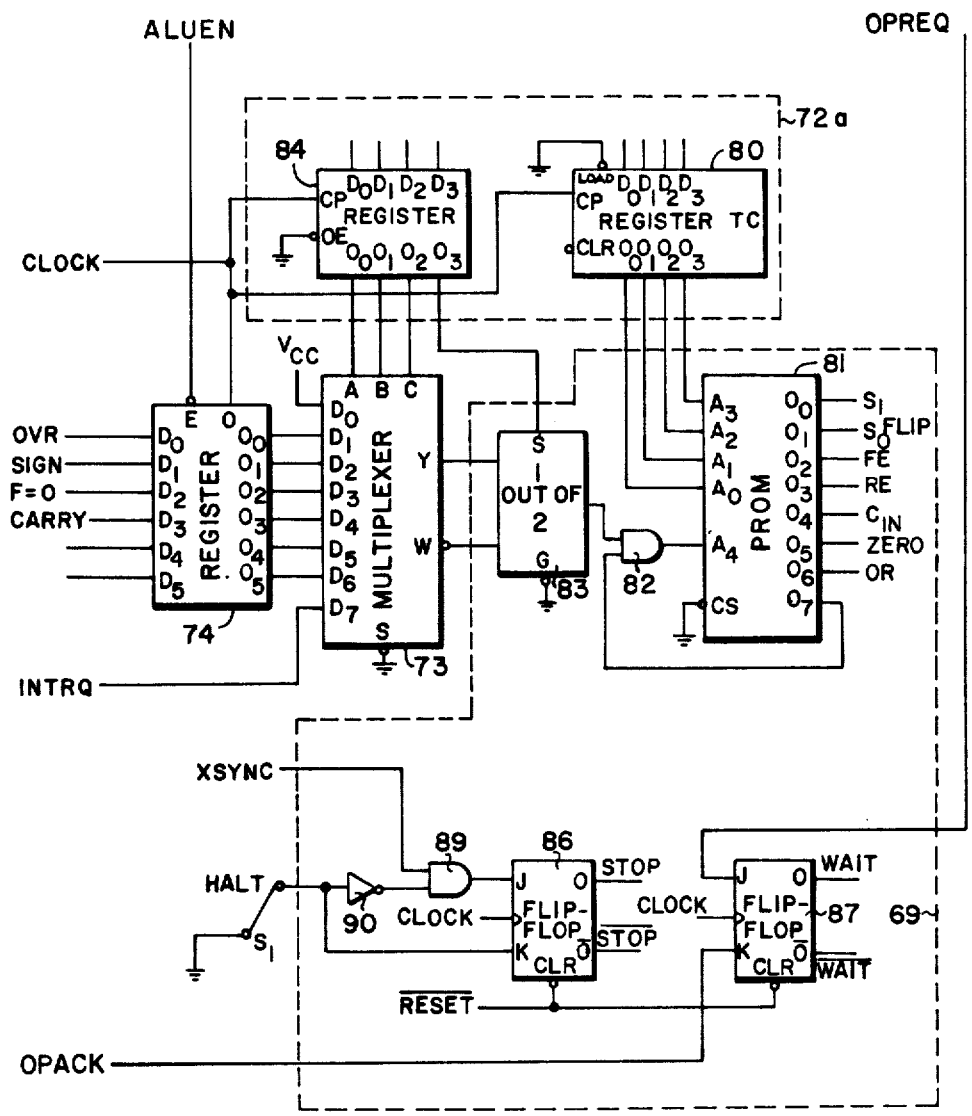
FIG. 2 is a simplified block diagram of the synchronization and enable logic, test condition multiplexer, and programme status word register of FIG. 1.

Turning now to FIG. 2, there is depicted therein, in more detail, synchronization and enable logic 69, test condition multiplexer 73, programme status word register 74, and the two least significant registers from microprogramme register 72, indicated collectively as 72a. In addition, the remaining two bits from microprogramme register 72 are shown and are referred as ALUEN and OPREQ.

The four bits stored in register 80 provide the microprogramme sequencer function instruction (for controller 63). These 4 bits provide the least significant address bits of the 5 bit address of PROM 81. PROM 81 stores 32 words, each word being 8 bits long. Seven of the output signals ($O_0$ to $O_6$, inclusive) go directly to the inputs of microprogramme sequence controller 63 (FIG. 1). The eighth output line ($O_7$) from PROM 81 is fed back to one input of AND gate 82 that drives the fifth address line for input $A_4$ of PROM 81. The signal at the other input to AND gate 82 is the output of 1-out-of-2 multiplexer 83. The output Y of multiplexer 73 is one of the eight input signals applied to its input ($D_o$ to $D_7$) (output W being the complement). One-out-of-2 selector 83 selects one of the two signals from outputs Y and W of multiplexer 73, and applies the selected signal to one of the inputs of AND gate 82. The addressing for multiplexer 73 and selector 83 is provided by the four bits stored in register 84; three of the bits are applied to inputs A, B and C of multiplexer 73, and the fourth bit is applied to input S of selector 83. One of multiplexer 73 inputs ($D_o$) is tied to Vcc (approximately $+5$ volts, d-c) which provides for an unconditional branch if every bit of register 84 is a logic 0. Six of the condition codes (from processor 51, FIG. 1, of which only four are shown) are stored in programme status word register 74. Every time an ALU function is selected and clocked, as indicated by signal ALUEN (i.e. ALU enable), the current value of the condition codes (e.g. OVR, SIGN, F=0, and carry out) are clocked into register 74. The eighth condition code bit (applied to input $D_7$ of multiplexer 73) is the interrupt request signal INTRQ which is latched externally by means not shown.

The programming of PROM 81 is such that the signal applied to input $A_4$ can be a logic 1 only if output $O_7$ of PROM 81 is a logic 1. If an interrupt is generated during an instruction fetch, the OR output (output $O_6$ of PROM 81) will be a logic 1.

An attempt to halt processor 51 (FIG. 1) using external switch S1 will be denied unless the current microinstruction cycle is a macroinstruction fetch. Starting processor 51 (FIG. 1) by closing switch S1 will always be granted and synchronized by flip-flop 86 because by definition the processor 51 stopped previously at an instruction fetch cycle which is also the first state which must be executed when processor 51 is turned on. When output Q (i.e. STOP) of flip-flop 86 is a logic 0, processor 51 will halt operation.

Synchronizing the relatively fast CCU 52 with relatively slow memory or input/output functions will now be dicussed. If a microinstruction causes a memory or input/output reference (e.g. a printer, a floppy-disc, etc.), the OPREQ bit (input to flip-flop 87) will be a logic 1. This signal (OPREQ) is latched into flip-flop 87 and stops processor 51 (i.e. WAIT or the Q output of flip-flop 87 is a logic 0), until the selected device acknowledges that the requested operation is complete, or the data is ready; this is done by making OPACK a logic 1. Flip-flop 87 synchronizes the event and restarts processor 51 (FIG. 1).

A wait is performed by inhibiting the clocks (not shown) that are contained within synchronization and enable logic 69.

Figure 3:
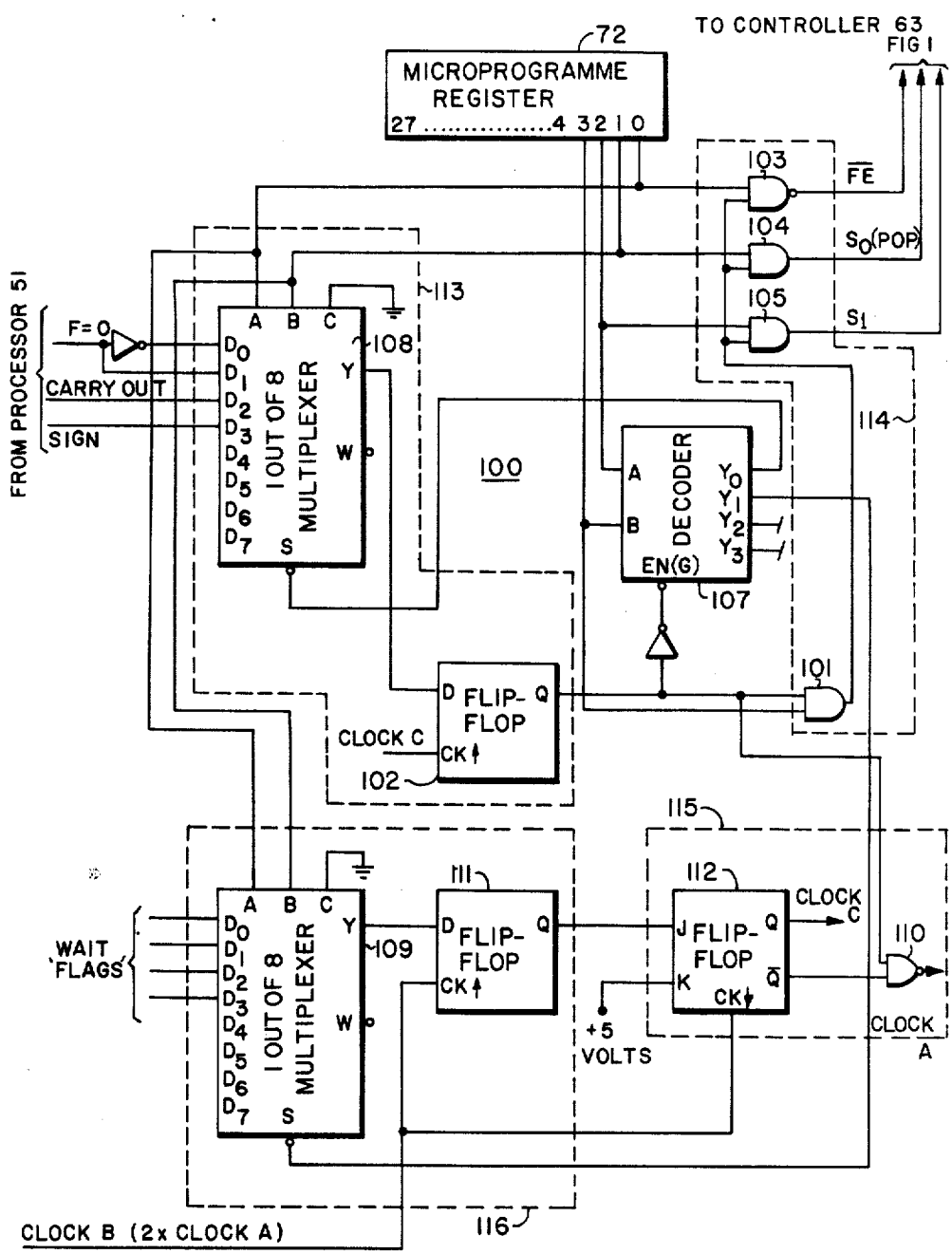
FIG. 3 is a simplified block diagram of the present invention.

FIG. 3 depicts the preferred embodiment of the present invention. It should be noted that the present invention, as depicted in FIG. 3, is directed to a microprogrammed peripheral controller (e.g. to control a disc memory, etc.) whereas the device of FIG. 1 depicts a general purpose computer. Logic circuit 100, of FIG. 3, is but a small portion of such a peripheral controller. A typical peripheral controller would be similar in construction to that shown in FIG. 1 with the exception that instruction register 58 (and associated buses), ROM 61, and programme status word register 74 would be absent. This occurs since in a typical peripheral controller, the only type of instruction present is a microinstruction (no macroinstructions). Consequently, no devices are required to translate from a macroinstruction into a microinstruction, as were required in the general purpose computer depicted in FIG. 1.

Logic circuit 100 is employed to control the sequencing of computer control unit 52 (FIG. 1) as well as control the synchronization of computer control unit 52 with external events (e.g. input or output functions) by extending the microcycle and it allows conditional execution of instructions based upon selected result "flags" (i.e. F=0, carry out, and sign) from processor 51 (FIG. 1).

As will be explained later, in greater detail, the operations that can be performed by logic circuit 100 are as follows:

(a) it can extend the current microinstruction until the selected wait "flag" becomes satisfied (i.e. it performs a wait operation);

(b) it can select one of four "flags" generated during the current microinstruction, which if true, will force the following instruction to be treated as though it were a null operation (i.e. it performs a skip operation);

(c) it can advance to the next sequential microinstruction;

(d) and it can perform a jump, a subroutine call, or a return from a subroutine.

Logic circuit 100, in general terms, performs all the above functions (using only 4 bits of microinstruction) by modifying the contents of microprogramme counter register 68 (FIG. 1). For functions c and d above, bit 3 of microprogramme register 72 (as depicted in FIG. 3) must be a logic 1. AND gate 101 has one input responsive to bit 3 from microprogramme register 72; AND gate 101 outputs a logic 1 if its second input from D-type flip-flop 102 is also a logic 1. The effect of a logic 1 on the output of AND gate 101 is to command NAND gate 103, and AND gates 104 and 105 to pass the value of the 3 least significant bits in microprogramme register 72 to microprogramme sequence controller 63 (as $\overline{FE}$, $S_o$ (POP), and $S_1$), with the 0 bit being inverted, in the process, by NAND gate 103. This is done when one of the following operations is to be performed: a jump to a subroutine, a return from a subroutine, a jump, or a sequential execution. AND gates 101, 104 and 105 together with NAND gate 103 form data gating device 114.

If the previous instruction was a skip, then the Q output of flip-flop 102 may be a logic 0, with the result that the output of AND gate 101 will be a logic 0, and the gates 103, 104 and 105 will in effect be commanded to ignore the data contained in bits 0 to 3 of register 72, and will cause the next address to be equal to the current address plus 1 by causing logic signals $\overline{FE}$, $S_o$ (POP), and $S_1$ to be logic 1, logic 0, and logic 0, respectively.

If bit 3 of register 72 is a logic 0, then the command will be either a SKIP or a WAIT command. The distinction then, between a SKIP and a WAIT command is made by bit 2 of register 72; if bit 2 is a logic 1 then the command is a WAIT and if bit 2 is a logic 0 then the command is a SKIP (remembering that bit 3 must be a logic 0). In either case, the value of bits 0 to 2, inclusive, in register 72 will not affect the operation of microprogramme sequence controller 63 (FIG. 1); since bit 3 of register 72 is a logic 0, the output of AND gate 101 will be a logic 0 with the result that the outputs of NAND gate 103, and AND gates 104 and 105 will be logic 1, logic 0, and logic 0, respectively, regardless of the contents of bits 0 to 2 of register 72. The result is to command microprogramme sequence controller 63 (FIG. 1) to address microprogramme counter register 68 (FIG. 1) increased by 1.

The operation of the skip function is controlled by bit 2 of register 72 which is decoded by decoder 107 (e.g. a Texas Instruments Model 74LS139) to enable (via a logic 0 on its $Y_o$ output) multiplexer 108 (e.g. Texas Instruments Model 74S251). Multiplexer 108 is normally disabled during all operations except a skip; a pull-up resistor (not shown) keeps the Y output at a logic 1 level when multiplexer 108 is not enabled. Consequently, flip-flop 102 is clocked (in the non-skip situation) with a logic 1 (at its D input) at the end of the current microinstruction, indicating "execute next microinstruction" (i.e. don't skip). However, when the current microinstruction is a SKIP, bits 1 and 0 of register 72 select (via multiplexer 108) one of the four "flags" from processor 51 (FIG. 1) to be routed to flip-flop 102. The four "flags" are instructions indicative of F=0, $\overline{F}$=0, carry out, and sign, all from processor 51 during the current microinstruction, as shown in FIG. 3. Multiplexer 108 and Flip-Flop 102 together form skip logic device 113.

If the "flag" selected by multiplexer 108 is a logic 0, then flip-flop 102 will be latched to a logic 0 level (rather than a logic 1 level, as is the case when a skip is not selected, or when the flag is a logic 1). For the instruction that follows, if the Q output of flip-flop 102 is a logic 0, the output of AND gate 101 is a logic 0, which results in the output of NAND gate 103 and AND gates 104 and 105 to be logic 1, logic 0, and logic 0, respectively. This sets the inputs to microprogramme sequence controller 63 to be normal (i.e. counter register 68 equals current count plus 1). In short, the states of bits 0 to 2 of register 72 are ignored.

Additionally, when the Q output of flip-flop 102 is a logic 0, NAND gate 110 produces a constant logic 1 on its output (regardless of the state of its other input) thereby inhibiting clock pulses referred to as Clock A) to processor 51 (FIG. 1) and all destination registers (not shown). It should be noted that the data still goes to the destination bus (not shown) as specified in register 72, but it is never clocked, thus effectively converting the instruction into a null operation. The instruction being skipped is still fetched, so that the time taken to execute a set of instructions is constant, even if some of the instructions are skipped. This is significant as it permits simple synchronous programme loops containing tests to be coded.

Another operation that can be controlled by the four least significant bits of register 72 is the WAIT operation. When a WAIT is decoded by decoder 107 (i.e. bit 3=logic 0, and bit 2=logic 1) the Y₁ output of decoder 107 is a logic 0 which enables multiplexer 109 (a Texas Instruments Model 74S251). It should be noted that, when not enabled, the Y output of multiplexer 109 is maintained at a logic 1 level by a pulp-up resistor not shown). The two least significant bits (i.e. bits 0 and 1) of register 72 select one out of the four inputs to multiplexer 109. Note that these four inputs (or "flags") are logic signals indicative of wait events that vary with the actual application. The selected input appears on output terminal Y of multiplexer 109 and is then sampled at twice the microinstruction rate (via clock B, input to flip-flop 111) and latched into flip-flop 111 at input D (to remove bounce). At each opposite phase of this same double speed clock B (i.e. every half cycle of the double speed clock B), the $\overline{Q}$ output of flip-flop 112 will change state to complete the microcycle if the Q output of flip-flop 111 is not a logic 0. This transition in state will end the current microinstruction, forming the rising edge of the clock signal (Clock A) for processor 51 and the rising edge of the clock signal (Clock C) for controller 63.

However, if the Q output of flip-flop 111 is a logic 0, then the $\overline{Q}$ output of flip-flop 112 will not change state and the current microinstruction will be extended for another cycle. As soon as the Q output of flip-flop 111 goes to a logic 1 state, flip-flop 112 will toggle, ending the current instruction (approximately 62 nanoseconds later, for a clock B having a period of 125 nanoseconds).

JK flip-flop 112 and NAND gate 110 together form clock device 115 which has two outputs, namely clock C and Clock A. Clock A can be selectively inhibited by either a logic 0 appearing on the Q output of flip-flop 102 (i.e. when the microinstruction is being skipped) or by a logic 0 appearing on the Q output of flip-flop 111 (i.e. during a WAIT condition). Clock C is selectively inhibited only when the Q output of flip-flop 111 is a logic 0 (i.e. during a WAIT condition). Note that multiplexer 109 and flip-flop 111 together form wait logic device 116.

Note also that Clock C, output from Q output of flip-flop 112, has the same frequency as Clock A. Clock C is not interrupted during a SKIP command as is Clock A. Clock A is employed by all the devices that are to be clocked only if an instruction is not skipped (e.g. processor 51). Clock C is employed by all the devices that need to be clocked, even during a SKIP command (e.g. microprogramme register 72 and sequence controller 63).

What is claimed is:

1. A logic circuit for controlling the sequencing of events in the operation of a digital computer by modifying the operation of a microprogramme sequence controller (63) and microprocessor (51), wherein said computer is under the control of binary microinstructions, said logic circuit characterized by:

a skip logic means (113), responsive to said microinstructions, for producing an output having either a first logic state indicative of a skip command or a second logic state indicative of a do not skip command;

a data gating means (114) for selectively transmitting to said sequence controller either first logic signals representative of corresponding logic bits in said microinstruction, or predetermined second logic signals, indicative of a skip command;

said data gating means (114) being responsive both to the output of said skip logic means and to one of the bits in said microinstruction such that the first logic state of either one can provide an override signal whereby said data gating means transmits said second logic signals, otherwise said first logic signals are transmitted;

a wait logic means (116), responsive to said microinstructions, for producing an output having either a first logic state indicative of a wait command or a second logic state indicative of a do not wait command;

a clock means (115) both for producing a first clock signal (C) and a second clock signal (A) wherein said first and second clock signals have the same frequency;

first means (110) for selectively inhibiting said second clock signal from appearing at the output of said clock means in response to the output of said skip logic means, whereby a skip condition is achieved due to the lack of clocking pulses to said processor (51); and second means (112) for selectively inhibiting both said first clock signal and said second clock signal from appearing at the output of said clock means, in response to the output of said wait logic means, whereby a wait condition is achieved due to the lack of clocking pulses to said digital computer.

2. The logic circuit of claim 1 wherein said skip logic means comprises a multiplexer circuit having a plurality of input ports, only one of which is at any one time connected to the single output port, and having at least one control port for the selection of which one of said input ports is to be connected to said output port, and a latch means responsive to the output of said multiplexer for temporarily storing the binary output signal of said multiplexer, said output signal indicating either a skip condition or a non-skip condition.

3. The logic circuit of claim 2 wherein said plurality of input ports are $2^n$ in number, and wherein said at least one control port is n in number, wherein n is a positive integer.

4. The logic circuit of claim 2 or 3 wherein said at least one control port is responsive to data bits in said microinstruction and wherein said latch means is a flip-flop.

5. The logic circuit of claim 1 wherein said data gating means comprises a control gate and a plurality of logic gates, each said logic gate having at least one input responsive to one bit in said microinstruction and each said logic gate having at least one input responsive to a control signal from a control gate, said control gate responsive to both the output from said skip logic means and at least one bit of said microinstruction.

6. The logic circuit of claim 5 wherein said logic gates are comprised of both AND logic gates and NAND logic gates and wherein said control logic gate is an AND logic gate.

7. The logic circuit of claim 6 wherein said logic gates are three in number and wherein one said logic gate is a NAND logic gate and wherein two said logic gates are AND logic gates.

8. The logic circuit of claim 1 wherein said wait logic means comprises a multiplexer circuit having a plurality of input ports, only one of which is at any one time connected to the single output port, and having at least one control port for the selection of which one of said input ports is to be connected to said output port, and a latch means responsive to the output of said multiplexer for temporarily storing the binary output signal of said multiplexer, said output signal indicating either a wait condition or a non-wait condition.

9. The logic circuit of claim 8 wherein said plurality of input ports are $2^m$ in number, and wherein said at least one control port is m in number, wherein m is a positive integer.

10. The logic circuit of claim 8 or 9 wherein said at least one control port is responsive to data bits in said microinstruction and wherein said latch means is a flip-flop.

11. The logic circuit of claim 1 wherein said clock means comprises a latch means and a NAND logic device, said clock means having at least one input responsive to the output of said wait logic means and one input responsive to the output of said skip logic means.

12. A logic circuit for controlling the sequencing of events in the operation of a digital computer by modifying the operation of a microprogramme sequence controller and microprocessor, wherein said computer is under the control of binary microinstructions, said logic circuit characterized by:

a skip logic means, responsive to said microinstructions, for producing an output having either a first logic state indicative of a skip command or a second logic state indicative of a do not skip command, said skip logic means comprising means for selecting one out of several inputs, and latching same in a latch means, the selection being made in response to at least one bit in said microinstruction;

a data gating means for selectively transmitting to said sequence controller either first logic signals representative of corresponding logic bits in said microinstruction, or predetermined second logic signals, indicative of a skip command;

said data gating means being responsive both to the output of said skip logic means and to one of the bits in said microinstruction such that the first logic state of either one can provide an override signal whereby said data gating means transmits said second logic signals, otherwise said first logic signals are transmitted;

a wait logic means, responsive to said microinstructions, for producing an output having either a first logic state indicative of a wait command or a second logic state indicative of a do not wait command, said wait logic means comprising means for selecting one out of several inputs, and latching same in a latch means, the selection being made in response to at least one bit in said microinstruction;

a clock means both for producing a first clock signal and a second clock signal wherein said first and second clock signals have the same frequency;

first means for selectively inhibiting said second clock signal from appearing at the output of said clock means in response to the output of said skip logic means, whereby a skip condition is achieved due to the lack of clocking pulses to said processor; and second means for selectively inhibiting both said first clock signal and said second clock signal from appearing at the output of said clock means, in response to the output of said wait logic means, whereby a wait condition is achieved due to the lack of clocking pulses to said digital computer.

13. The logic circuit of claim 12 wherein the same bits of said microinstruction are used to control the selection made by the multiplexers of both said skip logic means and said wait logic means.

* * * * *